US009313012B2

(12) United States Patent
Celebi et al.

(10) Patent No.: US 9,313,012 B2
(45) Date of Patent: Apr. 12, 2016

(54) APPARATUS AND METHODS FOR FULL DUPLEX COMMUNICATION

(71) Applicant: QUALCOMM Incorporated, San Diego, CA (US)

(72) Inventors: Samel Celebi, Summit, NJ (US); Luca Blessent, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/187,053

(22) Filed: Feb. 21, 2014

(65) Prior Publication Data

US 2015/0244505 A1    Aug. 27, 2015

(51) Int. Cl.
| | |
|---|---|
| *H04B 1/50* | (2006.01) |
| *H04B 1/56* | (2006.01) |
| *H04B 1/44* | (2006.01) |
| *H04B 1/00* | (2006.01) |
| *H04L 5/00* | (2006.01) |
| *H04L 5/14* | (2006.01) |
| *H04L 5/16* | (2006.01) |
| *H04W 52/36* | (2009.01) |
| *H04B 7/00* | (2006.01) |
| *H04W 88/02* | (2009.01) |
| *H04W 52/24* | (2009.01) |

(52) U.S. Cl.
CPC .............. *H04L 5/006* (2013.01); *H04L 5/0058* (2013.01); *H04L 5/1438* (2013.01); *H04L 5/1461* (2013.01); *H04L 5/16* (2013.01); *H04W 52/36* (2013.01); *H04W 52/241* (2013.01); *H04W 88/02* (2013.01)

(58) Field of Classification Search
CPC .............. H04B 1/50; H04B 1/05; H04B 1/44; H04B 1/406; H04L 5/006; H04L 5/1438; H04L 5/005; H04L 5/1461; H04L 5/16; H04W 88/02; H04W 52/241; H04W 52/368
USPC .......................................................... 370/277
See application file for complete search history.

(56) References Cited

U.S. PATENT DOCUMENTS

| | | | | |
|---|---|---|---|---|
| 7,212,569 | B1 * | 5/2007 | Clark ............................ | 375/233 |
| 2010/0091725 | A1 * | 4/2010 | Ishii ............................. | 370/329 |
| 2010/0092003 | A1 * | 4/2010 | Gygax et al. .................... | 381/66 |
| 2011/0195704 | A1 * | 8/2011 | Choi et al. ..................... | 455/423 |

(Continued)

FOREIGN PATENT DOCUMENTS

| | | |
|---|---|---|
| GB | 2499259 A | 8/2013 |
| WO | WO-2012/095683 A1 | 7/2012 |

OTHER PUBLICATIONS

International Search Report and Written Opinion—PCT/US2015/015526—ISAEPO—May 26, 2015, (10 pages).

(Continued)

*Primary Examiner* — Mark Rinehart
*Assistant Examiner* — Sanjay K Dewan
(74) *Attorney, Agent, or Firm* — Arent Fox LLP

(57) ABSTRACT

Apparatus and methods for wireless communications include determining a first echo cancellation metric indicative of a first amount of echo cancellation as a first function of a first transmit power of a first wireless communications device; and providing the first echo cancellation metric to a scheduling entity for scheduling full duplex (FD) or half duplex (HD) communication resources for the first wireless communications device.

27 Claims, 13 Drawing Sheets

(56) References Cited

U.S. PATENT DOCUMENTS

| | | | |
|---|---|---|---|
| 2012/0115522 A1* | 5/2012 | Nama et al. | 455/501 |
| 2012/0183133 A1 | 7/2012 | Lindström et al. | |
| 2012/0263078 A1* | 10/2012 | Tung | 370/277 |
| 2013/0102254 A1 | 4/2013 | Cyzs et al. | |
| 2013/0188530 A1 | 7/2013 | Pirskanen et al. | |
| 2013/0223294 A1 | 8/2013 | Karjalainen et al. | |
| 2013/0272170 A1* | 10/2013 | Chatterjee et al. | 370/280 |
| 2014/0141830 A1* | 5/2014 | Skov et al. | 455/522 |
| 2014/0302866 A1* | 10/2014 | Lee et al. | 455/452.1 |

OTHER PUBLICATIONS

Li S., et al., "Full-Duplex Wireless Communication Using Transmitter Output Based Echo Cancellation," IEEE Global Telecommunications Conference (GLOBECOM 2011), Dec. 2011, pp. 1-5.

* cited by examiner

APPARATUS AND METHODS FOR FULL DUPLEX COMMUNICATION

BACKGROUND

The present disclosure relates generally to communication systems, and more particularly, to full duplex communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Conventionally, the signals in the uplink (UL or reverse link) and the signals in the downlink (DL or forward link) are transmitted either in different frequency bands (e.g., by frequency domain duplexing (FDD)) or in the same frequency band but in different time slots (e.g., by time domain duplexing (TDD)). This method of separating UL and DL transmissions is referred to as half duplex (HD) communication. The separation of the signals in either frequency or time domain eliminates the possibility of a strong transmit signal of a user to drown a weak signal received by that same user. However, there may be users that have full duplex (FD) capability, such as users that are equipped with an echo canceller which allows them to receive and decode signals while also transmitting.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the disclosure provides a method of wireless communications that includes determining a first echo cancellation metric indicative of a first amount of echo cancellation as a first function of a first transmit power of a first wireless communications device; and providing the first echo cancellation metric to a scheduling entity for scheduling full duplex (FD) or half duplex (HD) communication resources for the first wireless communications device.

In another aspect, the disclosure provides an apparatus for wireless communications that includes means for determining a first echo cancellation metric indicative of a first amount of echo cancellation as a first function of a first transmit power of a first wireless communications device; and means for providing the first echo cancellation metric to a scheduling entity for scheduling FD or HD communication resources for the first wireless communications device.

In a further aspect, the disclosure provides an apparatus for wireless communications that includes a processing system configured to determine a first echo cancellation metric indicative of a first amount of echo cancellation as a first function of a first transmit power of a first wireless communications device; and schedule FD or HD communication resources for the first wireless communications device based on the first echo cancellation metric.

In yet another aspect, the disclosure provides a computer program product for wireless communications that includes a computer-readable medium including code for determining a first echo cancellation metric indicative of a first amount of echo cancellation as a first function of a first transmit power of a first wireless communications device; and code for providing the first echo cancellation metric to a scheduling entity for scheduling FD or HD communication resources for the first wireless communications device.

These and other aspects of the present disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As used herein, "Half Duplex (HD) communication" refers to performing only uplink (UL) communication or only downlink (DL) communication in each frequency band or each time slot, "Full Duplex (FD) communication" refers to simultaneous UL and DL communication in a frequency band or simultaneous UL and DL communication in a time slot, HD capability refers to being able to perform HD communication in a frequency band or time slot, and FD capability refers to being able to perform FD communication in a frequency band or time slot.

Some aspects of the present disclosure provide FD communication based on an amount of echo cancellation that may be achieved at user equipments (UEs) and/or eNodeBs. According to some present aspects, instead of a single bit information indicative of whether a UE or eNodeB has FD capability, a more detailed FD capability report may be used to determine whether to perform FD communication or HD communication. In some aspects, the UEs and/or eNodeBs first self-assess the amount of echo cancellation that they can perform, and then report it to a scheduling entity which may be an eNodeB. Such report may be, for example, a matrix that maps a value indicative of an amount of echo cancellation to a corresponding transmit power level, where the value indicative of the amount of echo cancellation may be, for example, the amount of measured echo suppression, the rise over thermal (ROT) due to self interference, the residual received power level after cancellation, or any combination of these.

In some present aspects, the scheduling entity uses these FD capability reports, and optionally other information such as path loss estimates at the locations of UEs and eNodeBs, to determine whether to schedule FD or HD communication between a UE and an eNodeB. Accordingly, some present aspects schedule FD/HD communications based on the variation of the FD capabilities amongst different UEs/eNodeBs, and/or based on the variation of the FD capabilities at different transmit power levels at UEs/eNodeBs. As such, some present aspects provide dynamic FD/HD scheduling based on the location of UEs/eNodeBs.

Figure 1:
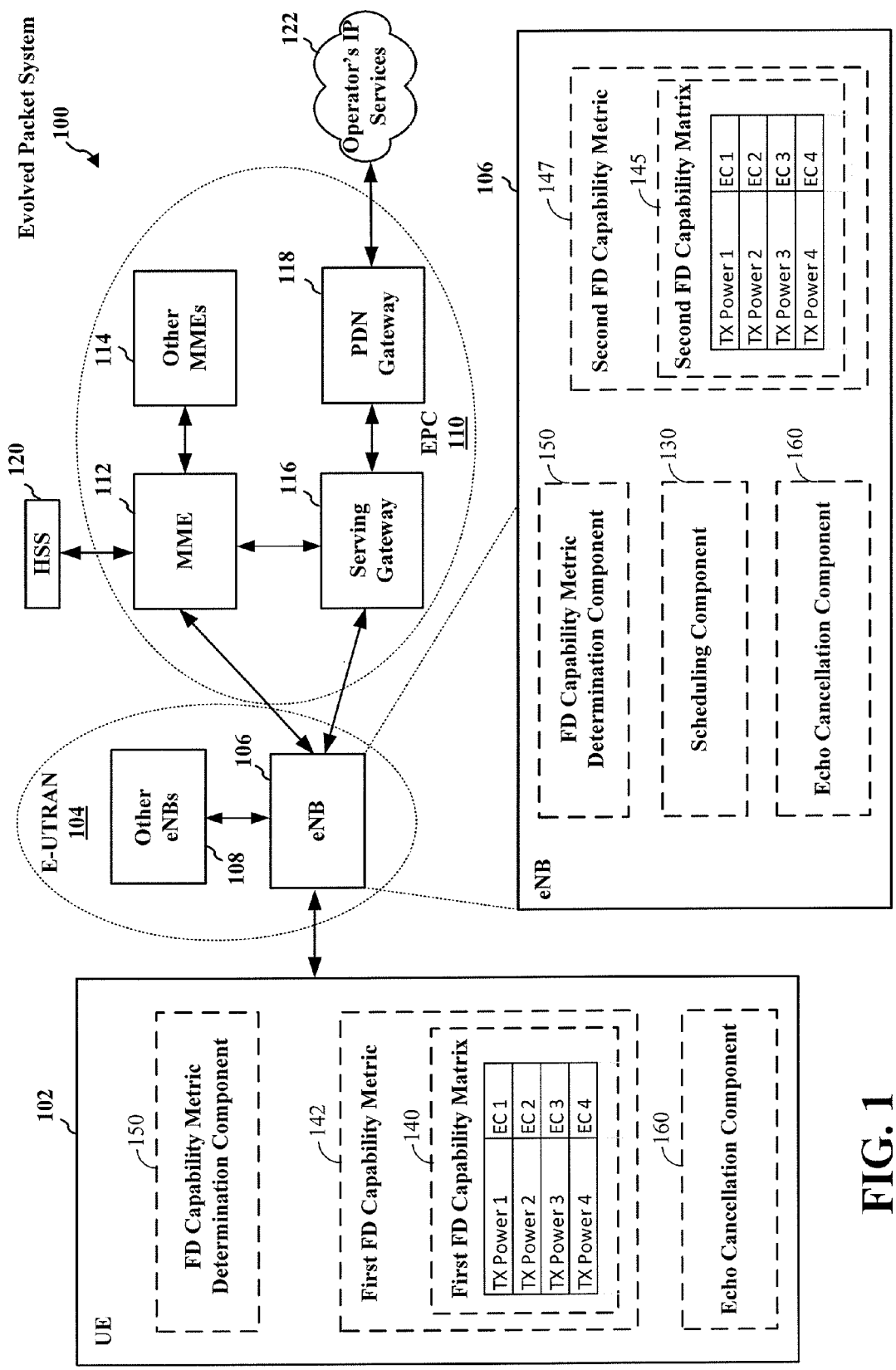
FIG. 1 is a diagram illustrating an example of a network architecture for wireless communications according to some present aspects.

Referring to FIG. 1, an LTE network architecture 100 is illustrated which may be referred to as an Evolved Packet System (EPS) 100. EPS 100 includes UE 102 that has FD capability to perform FD communications e.g., UE 102 can simultaneously transmit and receive signals. The EPS 100 may further include an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services. Moreover, while aspects of this disclosure are presented with respect to an LTE network architecture, the same or similar aspects may be extended to other types of networks.

The E-UTRAN includes the evolved Node B (eNB) 106 and other eNBs 108 that may have FD capability to perform FD communication. The eNB 106 can provide user and control planes protocol terminations toward UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 can provide an access point to the EPC 110 for UE 102. Examples of UE 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an user equipment, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets can be transferred through the Serving Gateway 116, which itself is connected to the PDN Gateway 118. The PDN Gateway 118 can provide UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

In some present aspects, UE 102 and/or eNB 106 may use echo cancellation to enable FD communication. For example, when the echo of a transmitter of a device leaks into a receiver of that device, echo cancellation may be used to cancel such echo. In some present aspects, eNB 106 and/or UE 102 may optionally include echo cancellation component 160 configured to perform echo cancellation to enable FD communication.

In some aspects, FD communication between UE 102 and eNB 106 within a wide coverage area may require strong echo cancellation on both UE 102 and eNB 106. In these aspects, strong echo cancellation may be achieved, for example, through echo cancellation in both the analog domain and the digital domain. In some networks, however, the amount of echo cancellation at UE 102 and/or eNB 106 may not be strong enough to support an entire cell coverage area. Alternatively or additionally, in some aspects, in order to achieve a simple echo cancellation scheme and/or save costs, UE 102 and/or eNB 106 may avoid echo cancellation in the analog domain and only perform echo cancellation in the digital domain. In these aspects, the resulting echo cancellation may still be sufficient to provide capacity gains within a limited region, but may not be sufficient for providing FD communications within an entire cell coverage area.

In one present aspect, however, FD communication between UE 102 and eNB 106 may be provided based on an amount of echo cancellation that can be achieved at UE 102 and/or eNB 106. For example, in some aspects, instead of a single bit information indicative of whether UE 102 and/or eNB 106 have FD capability, a more detailed FD capability report may be determined at UE 102 and/or eNB 106. For example, in some aspects, UE 102 and/or eNB 106 may first self-assess the amount of echo cancellation that they can perform, and then report it to a scheduling entity such as, for example, eNB 106. For example, in some aspects, eNB 106 may include scheduling component 130 that schedules resources for communication between UE 102 and eNB 106. In some aspects, for example, UE 102 may determine first FD capability metric 142 which may include a matrix, e.g., first FD capability matrix 140 of UE 102. Similarly, in some alternative or additional aspects, eNB 106 may determine second FD capability metric 147 which may include second FD capability matrix 145 of eNB 106. In these aspects, first FD capability metric 142 maps a value indicative of an amount of echo cancellation at UE 102 to a corresponding transmit power level of UE 102. Similarly, second FD capability metric 147 maps a value indicative of an amount of echo cancellation at eNB 106 to a corresponding transmit power level of eNB 106. In these aspects, the values indicative of the amount of echo cancellation may be, for example, the amount of measured echo suppression, the ROT due to self interference, the residual received power level after cancellation, or any combination of these.

In some aspects, in order to determine first FD capability metric 142 of UE 102 (or second FD capability metric 147 of eNB 106), UE 102 (or eNB 106) may send reference transmit signals at various power levels and then attempt to perform echo cancellation, e.g., eliminate the self echo leaking into the receiver chain of UE 102 (or eNB 106). Further, UE 102 (or eNB 106) may include FD capability metric determination component 150 that measures the amount of echo cancellation achieved, the ROT ratio due to own transmit signal, the residual receive signal power after echo cancellation, or a combination of these. Then, FD capability metric determination component 150 of UE 102 (or eNB 106) can record this capability metric (e.g., first FD capability metric 142 of UE 102 or second FD capability metric 147 of eNB 106) as a function of the corresponding transmit power levels and provide it as an FD capability report to the scheduling entity (e.g., scheduling component 130). For example, in some aspects UE 102 may share first FD capability metric 140 with scheduling component 130 of eNB 106 over a suitable mechanism (e.g., over the air or via a wired network), by using a protocol such as radio resource control (RRC).

In some aspects, scheduling component 130 can use the FD capability report (e.g., (e.g., first FD capability metric 142 of UE 102 and/or second FD capability metric 147 of eNB 106) and optionally other information such as path loss estimates corresponding to the locations of UE 102 and eNB 106, and determine whether to schedule FD or HD communication between UE 102 and eNB 106. For example, for a given pathloss between UE 102 and eNB 106, scheduling component 130 may project the aggregate throughput for the FD and HD modes of communication, and then choose the mode that yields the best throughput at each scheduling interval. In some aspects, for example, scheduling component 130 may determine a range of transmit powers below which FD communication yields higher capacities/throughput compared to HD communication.

Accordingly, in some present aspects, FD/HD communication is scheduled based on the variation of the FD capabilities amongst different UEs/eNodeBs, and/or based on the variation of the FD capabilities at different transmit power levels of UEs/eNodeBs. Also, some present aspects provide dynamic FD/HD scheduling based on the current location of UEs/eNodeBs.

Figure 2:
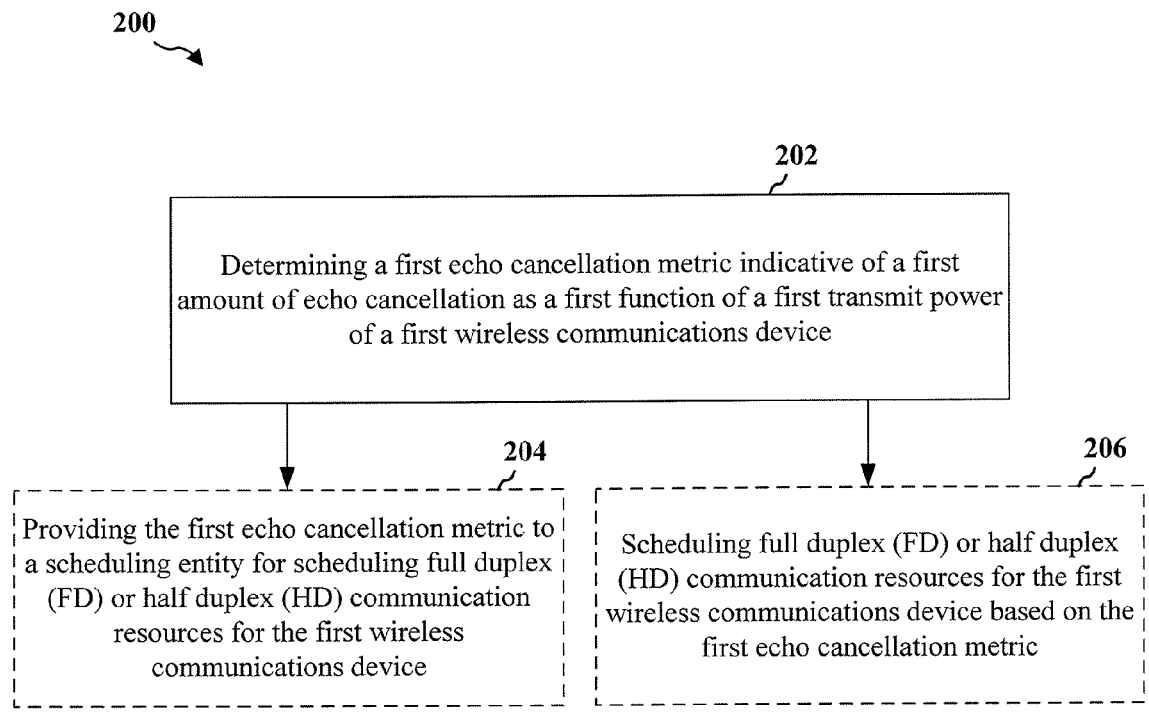
FIGS. 2-4 are flow charts of methods of wireless communications in aspects of the network architecture of FIG. 1.
Figure 3:
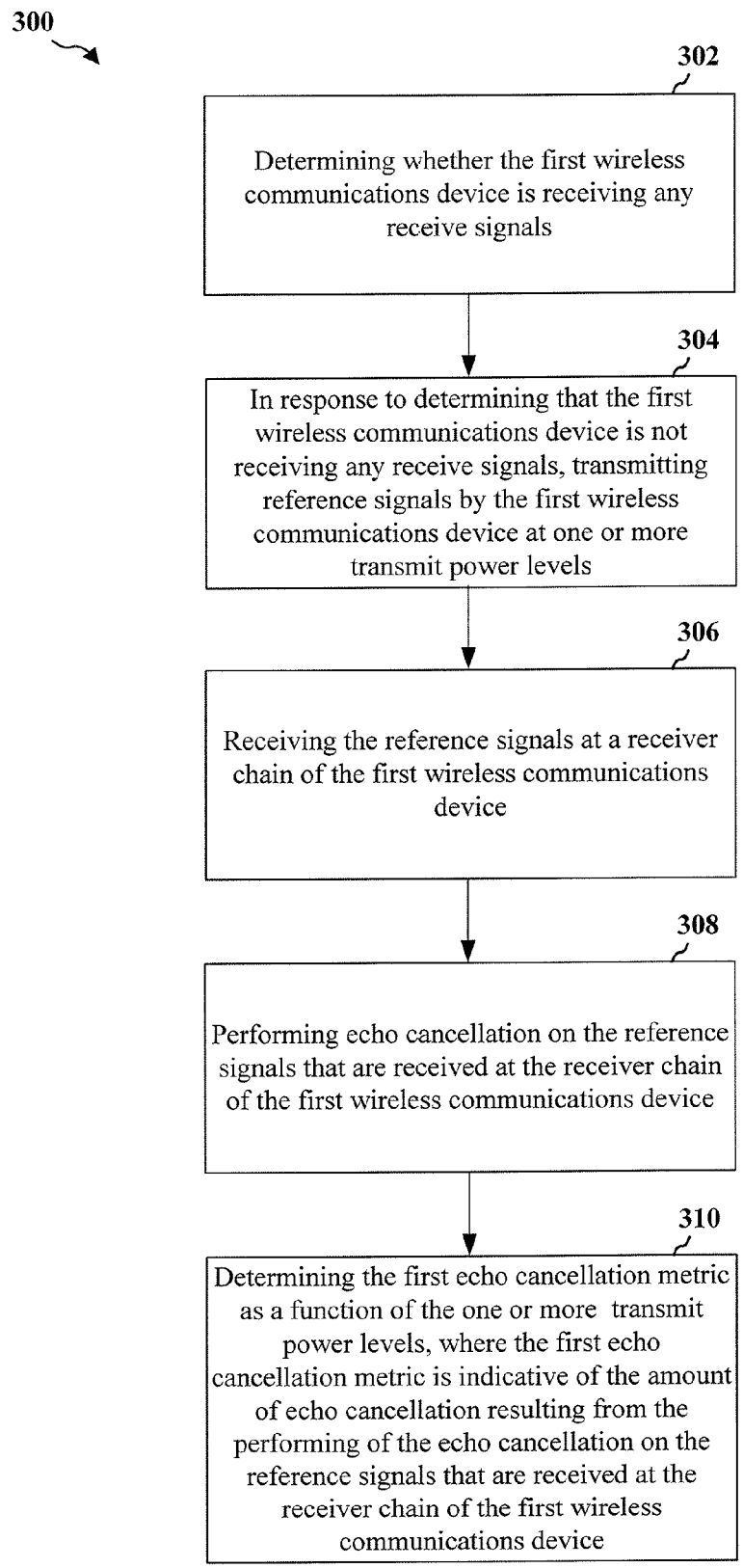
Figure 4:
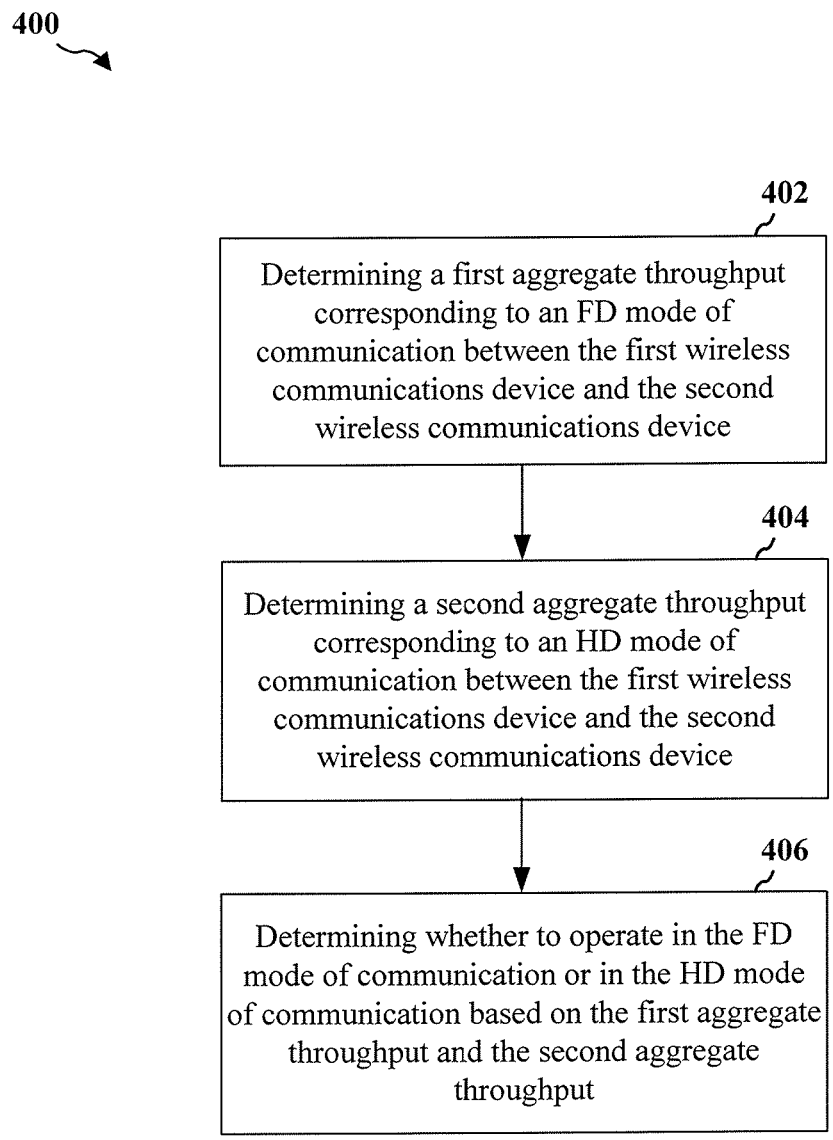

FIGS. 2-4 describe methods 200, 300, and 400, respectively, in aspects of the network architecture of FIG. 1. For example, methods 200 and 300 may be performed by UE 102 or eNB 106 executing FD capability metric determination component 150 (FIG. 1) as described herein. Also, for example, method 300 may be performed by eNB 106 executing scheduling component 130 (FIG. 1) as described herein.

Referring now to FIG. 2, at block 202, method 200 includes determining a first echo cancellation metric indicative of a first amount of echo cancellation as a first function of a first transmit power of a first wireless communications device. For example, FD capability metric determination component 150 of UE 102 (or eNB 106) may determine a first echo cancellation metric which may be first FD capability metric 142 (or second FD capability metric 147) indicative of an amount of echo cancellation as a function of a transmit power of UE 102 (or eNB 106).

Optionally, at block 204, method 200 may include providing the first echo cancellation metric to a scheduling entity for scheduling full duplex (FD) or half duplex (HD) communication resources for the first wireless communications device. For example, UE 102 (or eNB 106) may provide first FD capability metric 142 (or second FD capability metric 147) to a scheduling entity (which may be scheduling component 130 of eNB 106) that schedules FD or HD communication resources for UE 102 (or eNB 106). In some aspects, UE 102 can provide first FD capability metric 142 to scheduling component 130 by sending an RRC message to scheduling component 130, where the RRC message includes first FD capability metric 142.

Optionally, at block 206, method 200 may include scheduling full duplex (FD) or half duplex (HD) communication resources for the first wireless communications device based on the first echo cancellation metric. For example, a scheduling entity (which may be scheduling component 130 of eNB 106) may schedule FD or HD communication resources for UE 102 or eNB 106 based on first FD capability metric 142 or second FD capability metric 147.

In some aspects, in response to determining first FD capability metric 142 and/or second FD capability metric 147, scheduling component 130 can schedule the FD or HD communication resources for a communication between UE 102 and eNB 106 based on one or more of first FD capability metric 142, second FD capability metric 147, and a pathloss value between UE 102 and eNB 106. In some aspects, scheduling component 130 determines a range of transmit powers below which an FD mode of communication yields a higher throughput compared to an HD mode of communication.

Referring now to FIG. 3, method 300 provides an example and optional aspect of block 202 of FIG. 2 for determining the first echo cancellation metric.

At block 302, method 300 includes determining whether the first wireless communications device is receiving any receive signals. For example, FD capability metric determination component 150 of UE 102 (or eNB 106) may determine whether UE 102 (or eNB 106) is receiving any receive signals.

At block 304, method 300 includes, in response to determining that the first wireless communications device is not receiving any receive signals, transmitting reference signals at the first wireless communications device at one or more transmit power levels. For example, UE 102 (or eNB 106) may transmit reference signals at one or more transmit power levels when FD capability metric determination component 150 determines that UE 102 (or eNB 106) is not receiving any receive signals.

At block 306, method 300 includes receiving the reference signals at a receiver chain of the first wireless communications device. For example, UE 102 (or eNB 106) may receive the reference signals at a receiver chain of UE 102 (or eNB 106).

At block 308, method 300 includes performing echo cancellation on the reference signals that are received at the receiver chain of the first wireless communications device. For example, UE 102 (or eNB 106) may perform echo cancellation on the reference signals that are received at the receiver chain of UE 102 (or eNB 106).

At block 310, method 300 includes determining the first echo cancellation metric as a function of the one or more transmit power levels, where the first echo cancellation metric is indicative of the amount of echo cancellation resulting from the performing of the echo cancellation on the reference signals that are received at the receiver chain of the first wireless communications device. For example, FD capability metric determination component 150 of UE 102 (or eNB 106) may determine first FD capability metric 142 (or second FD capability metric 147) as a function of the one or more transmit power levels, where first FD capability metric 142 (or second FD capability metric 147) is indicative of the amount of echo cancellation resulting from performing echo cancellation on the reference signals received at the receiver chain of UE 102 (or eNB 106). First FD capability metric 142 (or second FD capability metric 147) can include one or more suitable factors. For example, first FD capability metric 142 (or second FD capability metric 147) can include a residual receive power at which, after the performing of the echo cancellation on the reference signals, the reference signals are received by UE 102 (or eNB 106). As another example, first FD capability metric 142 (or second FD capability metric 147) can include a difference between the residual receive power and a respective one of the one or more transmit power levels. As yet another example, first FD capability metric 142 (or second FD capability metric 147) can include a rise over thermal ratio at UE 102 (or eNB 106) upon receiving the reference signals.

Referring now to FIG. 4, method 400 provides an example and optional aspect corresponding to the operation of the scheduling entity at blocks 204 and 206 of FIG. 2 to schedule the FD or HD communication resources.

At block 402, method 400 includes determining a first aggregate throughput corresponding to an FD mode of communication between the first wireless communications device and the second wireless communications device. For example, scheduling component 130 may determine a first aggregate throughput corresponding to an FD mode of communication between UE 102 and eNB 106.

At block 404, method 400 includes determining a second aggregate throughput corresponding to an HD mode of communication between the first wireless communications device and the second wireless communications device. For example, scheduling component 130 may determine a second aggregate throughput corresponding to an HD mode of communication between UE 102 and eNB 106.

At block 406, method 400 includes determining whether to operate in the FD mode of communication or in the HD mode of communication based on the first aggregate throughput and the second aggregate throughput. For example, scheduling component 130 may determine whether to operate in the FD mode of communication or in the HD mode of communication based on the first aggregate throughput and the second aggregate throughput. For example, scheduling component 130 may determine to operate in the FD mode of operation when the first aggregate throughput is greater than the second aggregate throughput, and may determine to operate in the HD mode of operation when the first aggregate throughput is less than the second aggregate throughput. In some aspects, scheduling component 130 performs the determining of whether to operate in the FD mode of communication or in the HD mode of communication at each scheduling interval.

Figure 5:
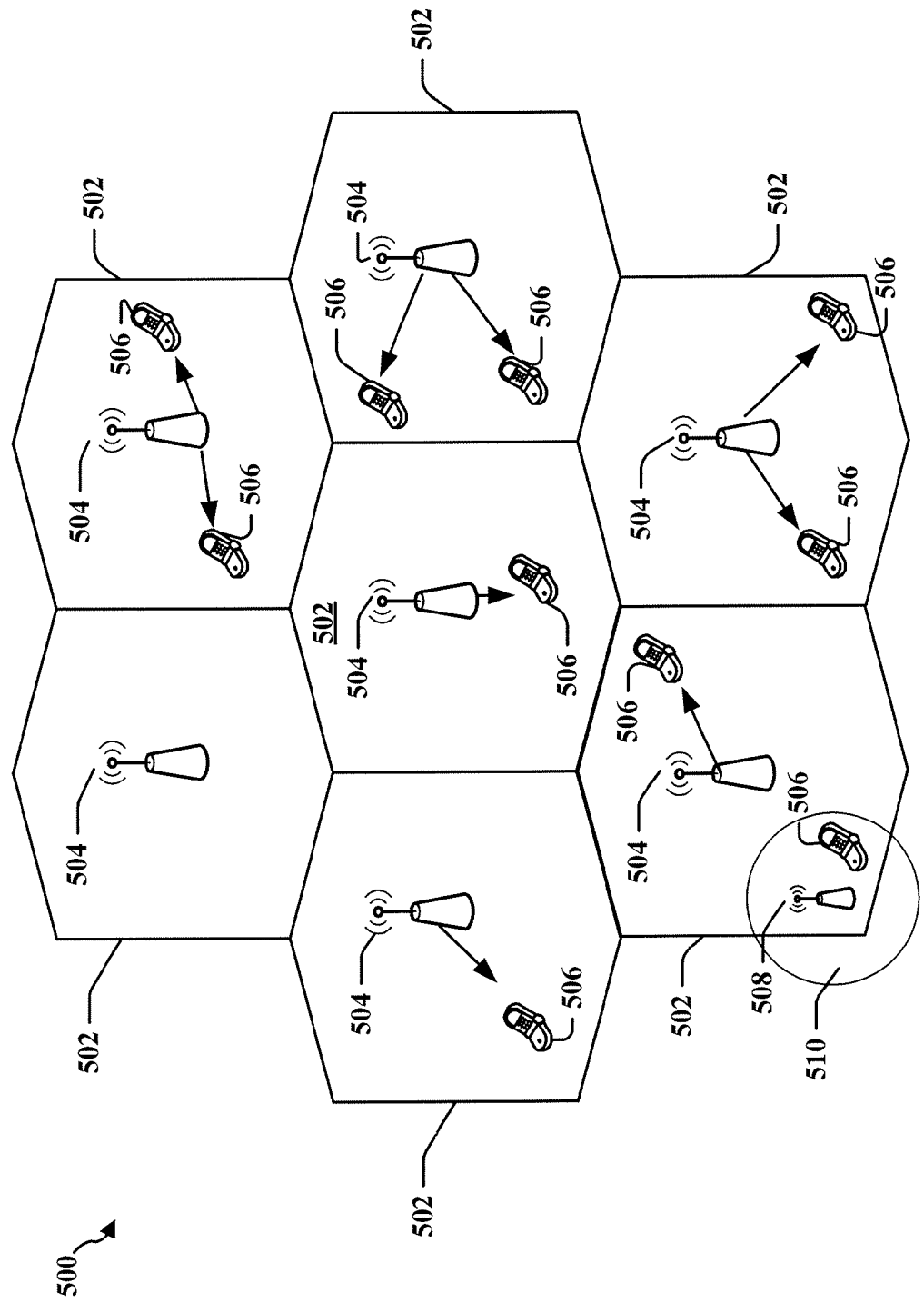
FIG. 5 is a diagram illustrating an example of an access network including aspects of the network architecture of FIG. 1.

Referring to FIG. 5, an example of an access network 500 that may be part of an LTE network architecture is illustrated. Access network 500 includes UEs 506 which may be examples of UE 102 having FD capability metric determination component 150 and/or echo cancellation component 160 of FIG. 1. The UEs 506 may be configured to perform any functions described herein with respect to UE 102, FD capability metric determination component 150, or echo cancellation component 150 of FIG. 1. Also, access network 500 includes eNBs 504 and eNB 508 which may be examples of eNB 106 having scheduling component 130, FD capability metric determination component 150, and/or echo cancellation component 160 of FIG. 1. The eNB 504 and eNB 508 may be configured to perform any functions described herein with respect to eNB 106, scheduling component 130, FD capability metric determination component 150, or echo cancellation component 160 of FIG. 1.

In this example, the access network 500 is divided into a number of cellular regions (cells) 502. One or more lower power class eNBs 508 may have cellular regions 510 that overlap with one or more of the cells 502. The lower power class eNB 508 may be a small cell (e.g., a femto cell (e.g., home eNB (HeNB)), pico cell, micro cell, or remote radio head (RRH)). The macro eNBs 504 are each assigned to a respective cell 502 and are configured to provide access point to the EPC 110 for all the UEs 506 in the cells 502. There is no centralized controller in this example of an access network 500, but a centralized controller may be used in alternative configurations. The eNBs 504 are responsible for all radio related functions including radio bearer control, admission control, mobility control, scheduling, security, and connectivity to the serving gateway 116.

The modulation and multiple access scheme employed by the access network 500 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi- Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 504 may have multiple antennas supporting MIMO technology. The use of MIMO technology enables the eNBs 504 to exploit the spatial domain to support spatial multiplexing, beamforming, and transmit diversity. Spatial multiplexing may be used to transmit different streams of data simultaneously on the same frequency. The data steams may be transmitted to a single UE 506 to increase the data rate or to multiple UEs 506 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 506 with different spatial signatures, which enables each of the UE(s) 506 to recover the one or more data streams destined for that UE 506. On the UL, each UE 506 transmits a spatially precoded data stream, which enables the eNB 504 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 6:
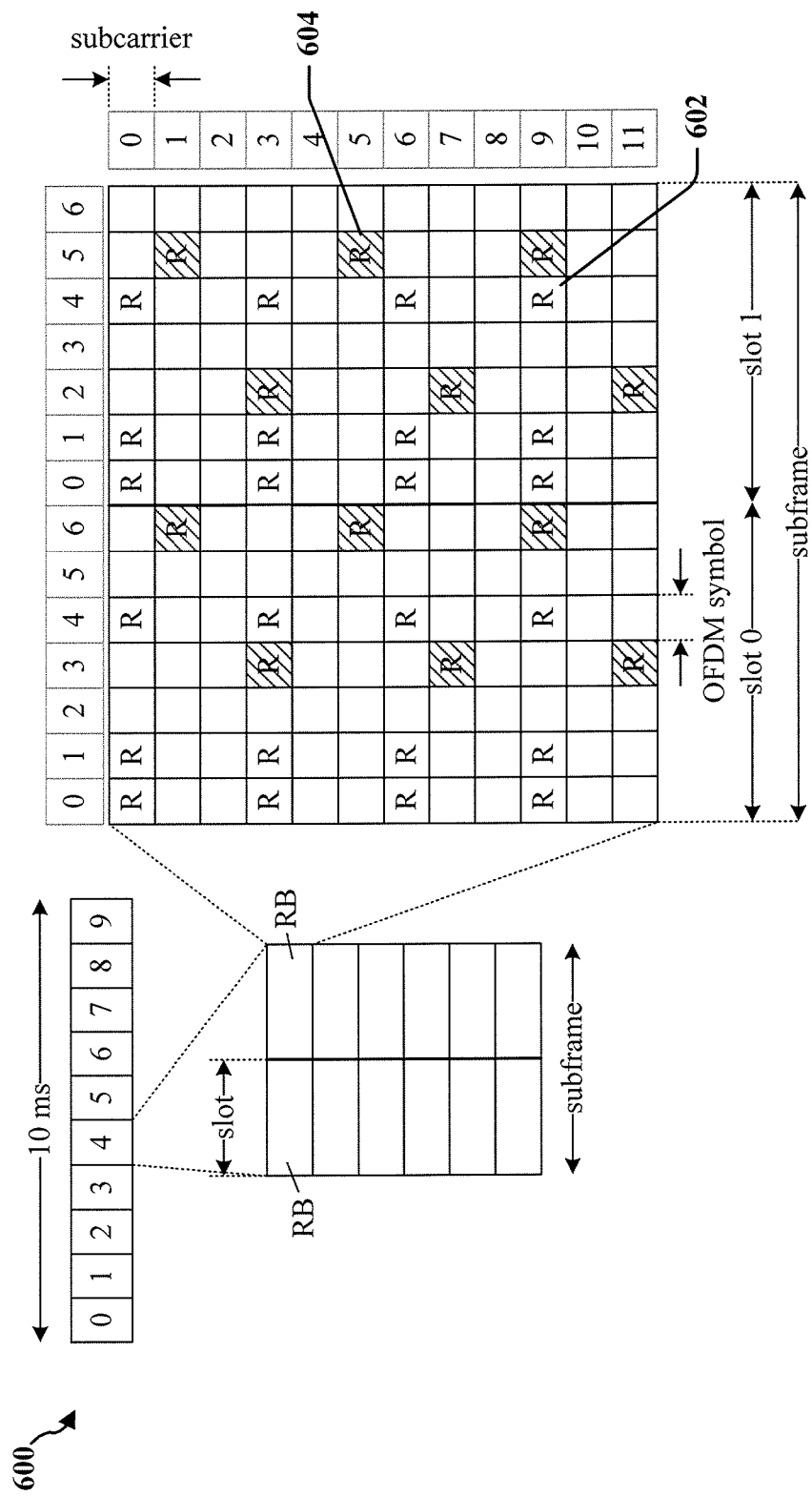
FIG. 6 is a diagram illustrating an example of a DL frame structure in LTE in aspects of the network architecture of FIG. 1.

FIG. 6 is a diagram 600 illustrating an example of a DL frame structure in LTE and that may be used in FD and HD communications in an LTE network architecture such as the one shown in FIG. 1. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 602, 604, include DL reference signals (DL-RS). The DL-RS include Cell-specific RS (CRS) (also sometimes called common RS) 602 and UE-specific RS (UE-RS) 604. UE-RS 604 are transmitted only on the resource blocks upon which the corresponding physical DL shared channel (PDSCH) is mapped. The number of bits carried by each resource element depends on the modulation scheme. Thus, the more resource blocks that a UE (e.g., UE 102 of FIG. 1) receives and the higher the modulation scheme, the higher the data rate for the UE.

Figure 7:
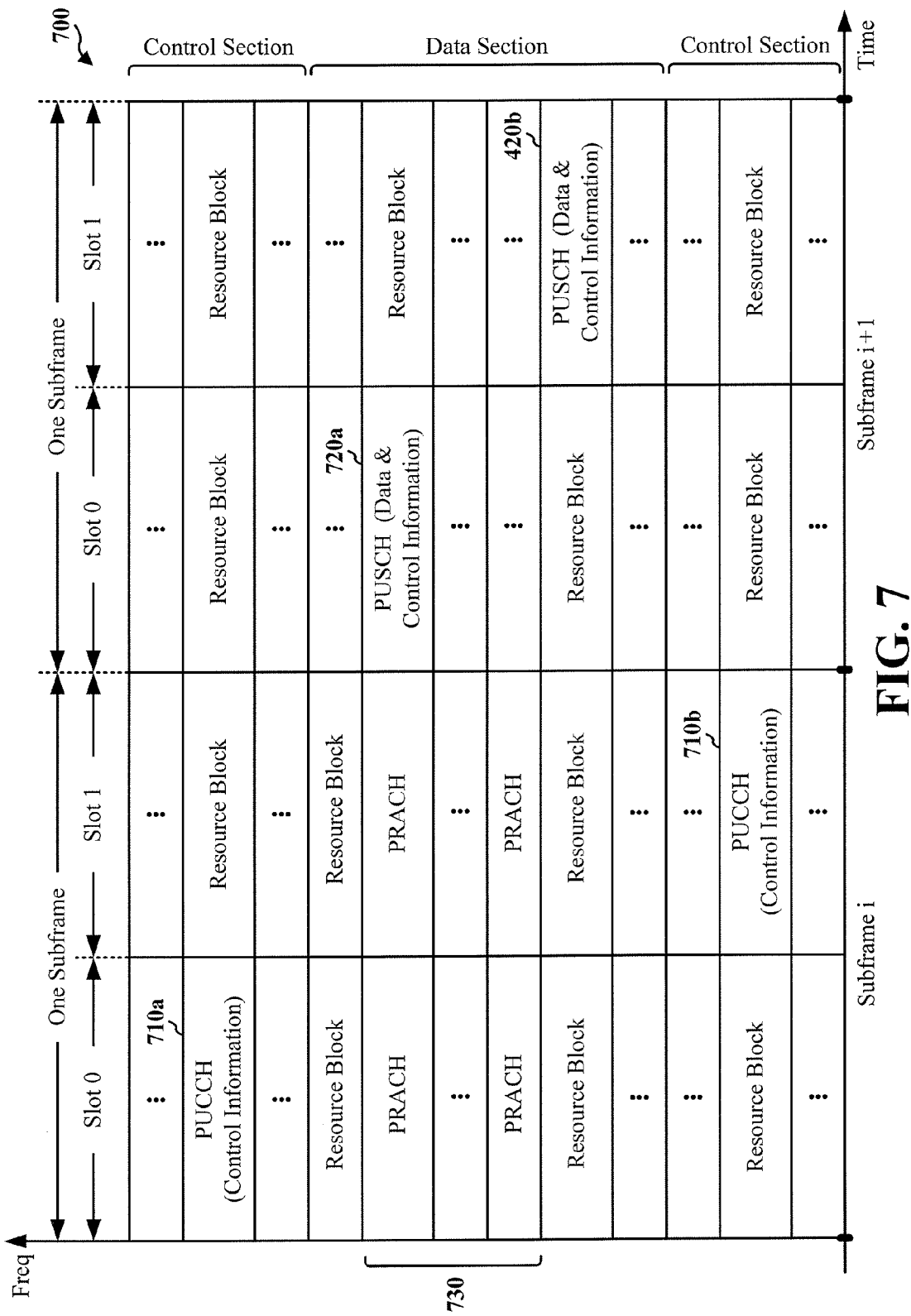
FIG. 7 is a diagram illustrating an example of an UL frame structure in LTE in aspects of the network architecture of FIG. 1.

FIG. 7 is a diagram 700 illustrating an example of an UL frame structure in LTE and that may be used in FD and HD communications in an LTE network architecture such as the one shown in FIG. 1. The available resource blocks for the UL may be partitioned into a data section and a control section. The control section may be formed at the two edges of the system bandwidth and may have a configurable size. The resource blocks in the control section may be assigned to UEs (e.g., UE 102 of FIG. 1) for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 710a, 710b in the control section to transmit control information to an eNB (e.g., eNB 106 of FIG. 1). The UE may also be assigned resource blocks 720a, 720b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 730. The PRACH 730 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 8:
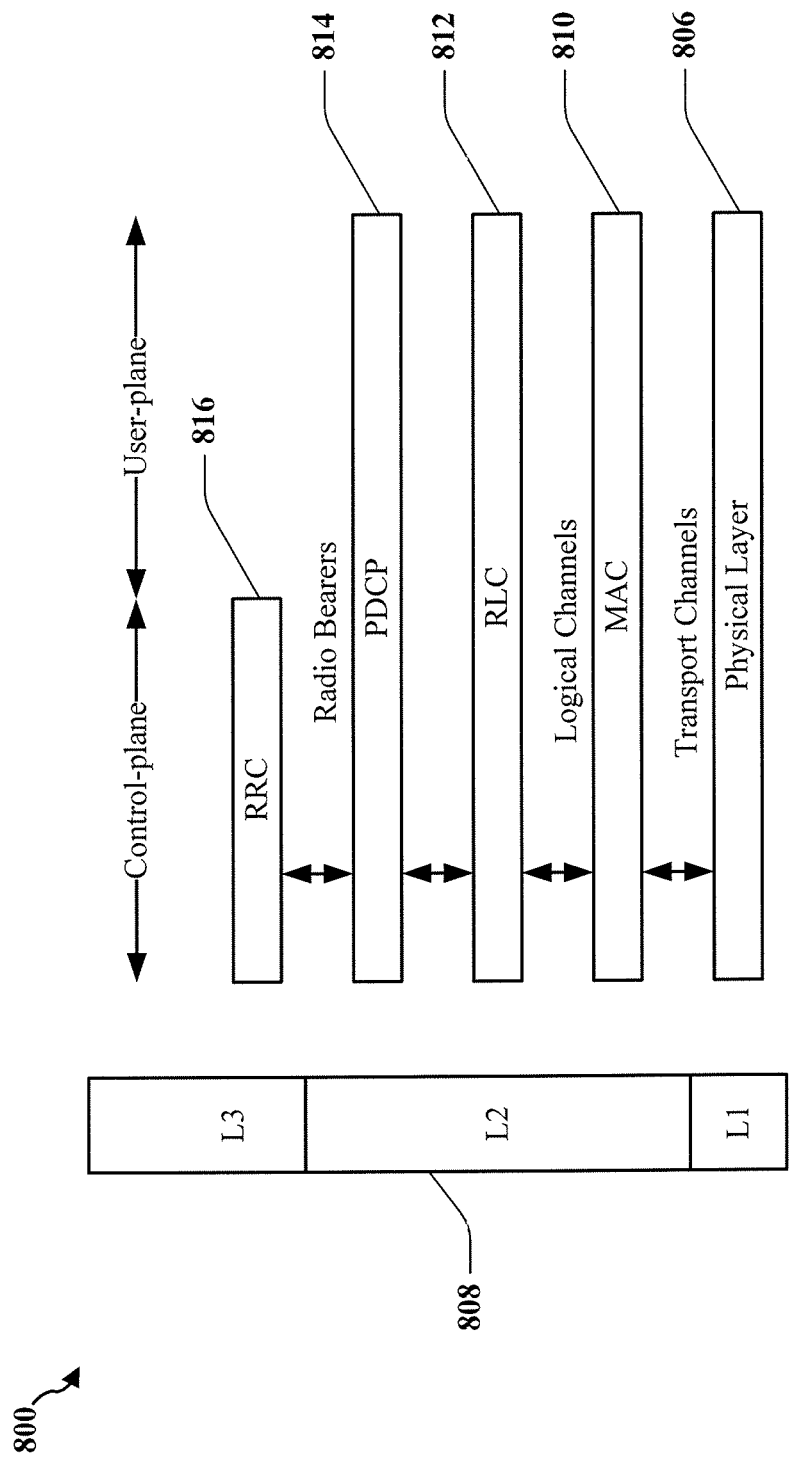
FIG. 8 is a diagram illustrating an example of a radio protocol architecture for the user and control planes in aspects of the network architecture of FIG. 1.

FIG. 8 is a diagram 800 illustrating an example of a radio protocol architecture for the user and control planes in LTE and that may be used in FD and HD communications in an LTE network architecture such as the one shown in FIG. 1. The radio protocol architecture for the UE and the eNB (e.g., UE 102 and eNB 106 of FIG. 1) is shown with three layers: Layer 1, Layer 2, and Layer 3. Layer 1 (L1 layer) is the lowest layer and implements various physical layer signal processing functions. The L1 layer will be referred to herein as the physical layer 806. Layer 2 (L2 layer) 808 is above the physical layer 806 and is responsible for the link between the UE and eNB over the physical layer 806.

In the user plane, the L2 layer 808 includes a media access control (MAC) sublayer 510, a radio link control (RLC) sublayer 812, and a packet data convergence protocol (PDCP) 814 sublayer, which are terminated at the eNB on the network side. Although not shown, the UE may have several upper layers above the L2 layer 808 including a network layer (e.g., IP layer) that is terminated at the PDN gateway 118 on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between eNBs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

In the control plane, the radio protocol architecture for the UE and eNB is substantially the same for the physical layer 806 and the L2 layer 808 with the exception that there is no header compression function for the control plane. The control plane also includes a radio resource control (RRC) sublayer 816 in Layer 3 (L3 layer). The RRC sublayer 816 is responsible for obtaining radio resources (i.e., radio bearers) and for configuring the lower layers using RRC signaling between the eNB and the UE.

Figure 9:
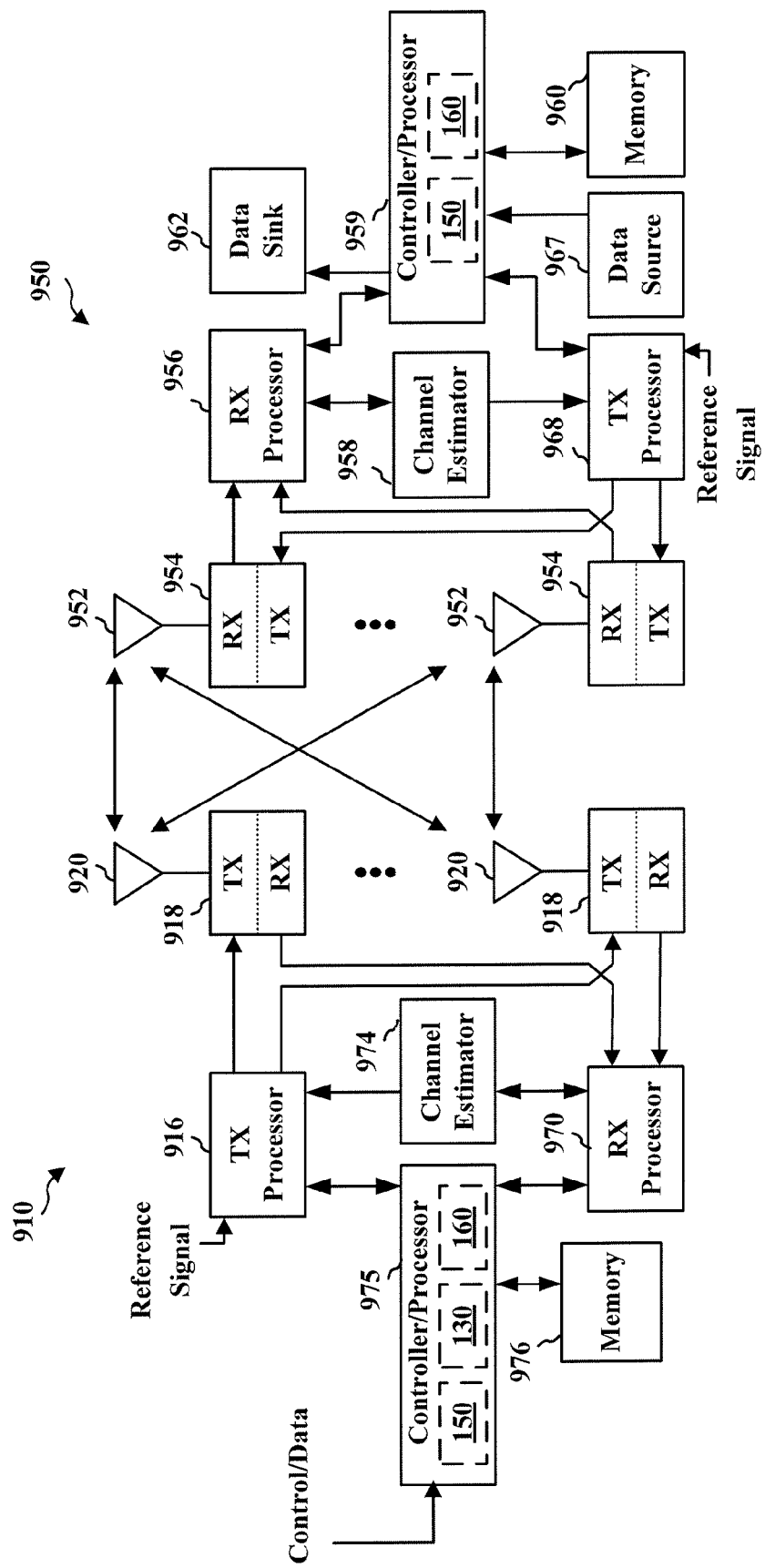
FIG. 9 is a diagram illustrating an example of an evolved Node B and user equipment in an access network in aspects of the network architecture of FIG. 1.

FIG. 9 is a block diagram of an eNB 910 in communication with a UE 950 in an access network, where UE 950 may be an example of UE 102 having FD capability metric determination component 150 and/or echo cancellation component 160 of FIG. 1. UE 950 may be configured to perform any functions described herein with respect to UE 102, FD capability metric determination component 150, or echo cancellation component 160 of FIG. 1. Also, eNB 910 may be an example of eNB 106 having scheduling component 130, FD capability metric determination component 150, and/or echo cancellation component 160 of FIG. 1. eNB 910 may be configured to perform any functions described herein with respect to eNB 106, scheduling component 130, FD capability metric determination component 150, or echo cancellation component 160 of FIG. 1.

In the DL, upper layer packets from the core network are provided to a controller/processor 975. The controller/processor 975 implements the functionality of the L2 layer. In the DL, the controller/processor 975 provides header compression, ciphering, packet segmentation and reordering, multiplexing between logical and transport channels, and radio resource allocations to the UE 950 based on various priority metrics. The controller/processor 975 is also responsible for HARQ operations, retransmission of lost packets, and signaling to the UE 950.

The transmit (TX) processor 916 implements various signal processing functions for the L1 layer (i.e., physical layer). The signal processing functions includes coding and interleaving to facilitate forward error correction (FEC) at the UE 950 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream is then provided to a different antenna 920 via a separate transmitter 918TX. Each transmitter 918TX modulates an RF carrier with a respective spatial stream for transmission.

At the UE 950, each receiver 954RX receives a signal through its respective antenna 952. Each receiver 954RX recovers information modulated onto an RF carrier and provides the information to the receive (RX) processor 956. The RX processor 956 implements various signal processing functions of the L1 layer. The RX processor 956 performs spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 910. These soft decisions may be based on channel estimates computed by the channel estimator 958. The soft decisions are then decoded and deinterleaved to recover the data and control signals that were originally transmitted by the eNB 910 on the physical channel. The data and control signals are then provided to the controller/processor 959.

The controller/processor 959 implements the L2 layer. The controller/processor 959 can be associated with a memory 960 that stores program codes and data. The memory 960 may be referred to as a computer-readable medium. In the UL, the controller/processor 959 provides demultiplexing between transport and logical channels, packet reassembly, deciphering, header decompression, control signal processing to recover upper layer packets from the core network. The upper layer packets are then provided to a data sink 962, which represents all the protocol layers above the L2 layer. Various control signals may also be provided to the data sink 962 for L3 processing. The controller/processor 959 is also responsible for error detection using an acknowledgement (ACK) and/or negative acknowledgement (NACK) protocol to support HARQ operations.

In the UL, a data source 967 is used to provide upper layer packets to the controller/processor 959. The data source 967 represents all protocol layers above the L2 layer. Similar to the functionality described in connection with the DL transmission by the eNB 910, the controller/processor 959 implements the L2 layer for the user plane and the control plane by providing header compression, ciphering, packet segmentation and reordering, and multiplexing between logical and transport channels based on radio resource allocations by the eNB 910. The controller/processor 959 is also responsible for HARQ operations, retransmission of lost packets, and signaling to the eNB 910.

Channel estimates derived by a channel estimator 958 from a reference signal or feedback transmitted by the eNB 910 may be used by the TX processor 968 to select the appropriate coding and modulation schemes, and to facilitate spatial processing. The spatial streams generated by the TX processor 968 are provided to different antenna 952 via separate transmitters 954TX. Each transmitter 954TX modulates an RF carrier with a respective spatial stream for transmission.

The UL transmission is processed at the eNB 910 in a manner similar to that described in connection with the receiver function at the UE 950. Each receiver 918RX receives a signal through its respective antenna 920. Each receiver 918RX recovers information modulated onto an RF carrier and provides the information to a RX processor 970. The RX processor 970 may implement the L1 layer.

The controller/processor 975 implements the L2 layer. The controller/processor 975 can be associated with a memory 976 that stores program codes and data. The memory 976 may be referred to as a computer-readable medium. In the UL, the control/processor 975 provides demultiplexing between transport and logical channels, packet reassembly, deciphering, header decompression, control signal processing to recover upper layer packets from the UE 950. Upper layer packets from the controller/processor 975 may be provided to the core network. The controller/processor 975 is also responsible for error detection using an ACK and/or NACK protocol to support HARQ operations.

Figure 10:
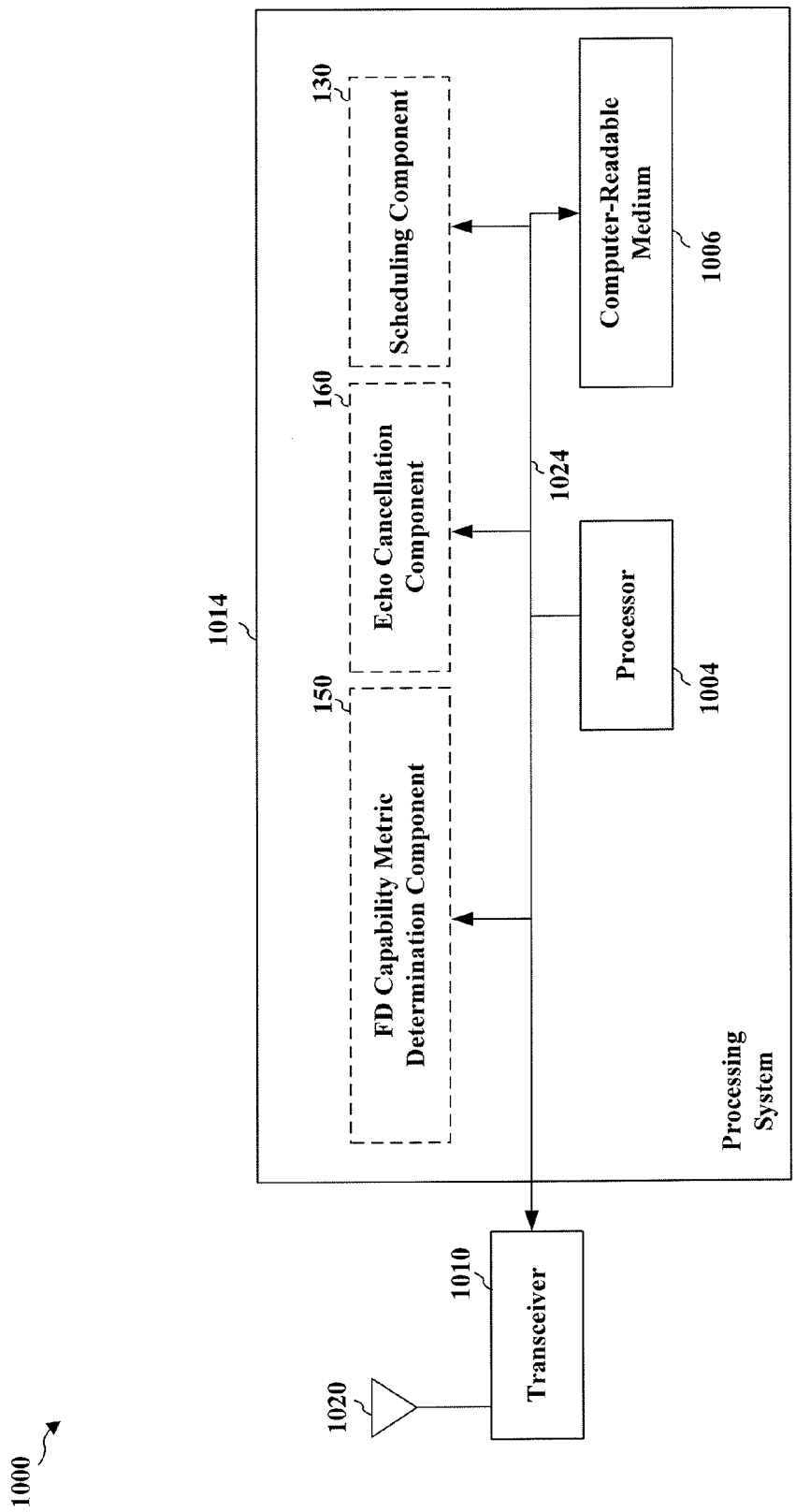
FIG. 10 is a diagram illustrating an example of a hardware implementation for an apparatus employing a processing system including aspects of the network architecture of FIG. 1.

FIG. 10 is a diagram illustrating an example of a hardware implementation for an apparatus 1000 employing a processing system 1014, where apparatus 1000 may be an example of UE 102 or eNB 106. Apparatus 1000 may include one or more of scheduling component 130, FD capability metric determination component 150, or echo cancellation component 160 of FIG. 1, and may be configured to perform any functions described herein with respect to UE 102, eNB 106, scheduling component 130, FD capability metric determination component 150, or echo cancellation component 160 of FIG. 1. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, scheduling component 130, FD capability metric determination component 150, echo cancellation component 160, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system may further include scheduling component 130, FD capability metric determination component 150, or echo cancellation component 160. The modules may be software modules running in the processor 1004, resident/stored in the computer readable medium 1006, one or more hardware modules coupled to the processor 1004, or some combination thereof. The processing system 1014 may be a component of the eNB 910 or the UE 950 and may include a respective one of the memory 976, 960, and/or at least one of the TX processor 916, 968, the RX processor 970, 956, and the controller/processor 975, 959.

In one configuration, the apparatus 1000 for wireless communication includes means for determining a first echo cancellation metric indicative of a first amount of echo cancellation as a first function of a first transmit power of a first wireless communications device, and means for providing the first echo cancellation metric to a scheduling entity that is configured to schedule full duplex (FD) or half duplex (HD) communication resources for the first wireless communications device. The aforementioned means may be one or more of the aforementioned modules of the apparatus 1000 and/or the processing system 1014 of the apparatus 1000 configured to perform the functions recited by the aforementioned means. As described supra, the processing system 1014 may include a respective one of the TX Processor 916, 968, the RX Processor 970, 956, and the controller/processor 975, 959. As such, in one configuration, the aforementioned means may be a respective one of the TX Processor 916, 968, the RX Processor 970, 956, and the controller/processor 975, 959, configured to perform the functions recited by the aforementioned means.

Figure 11:
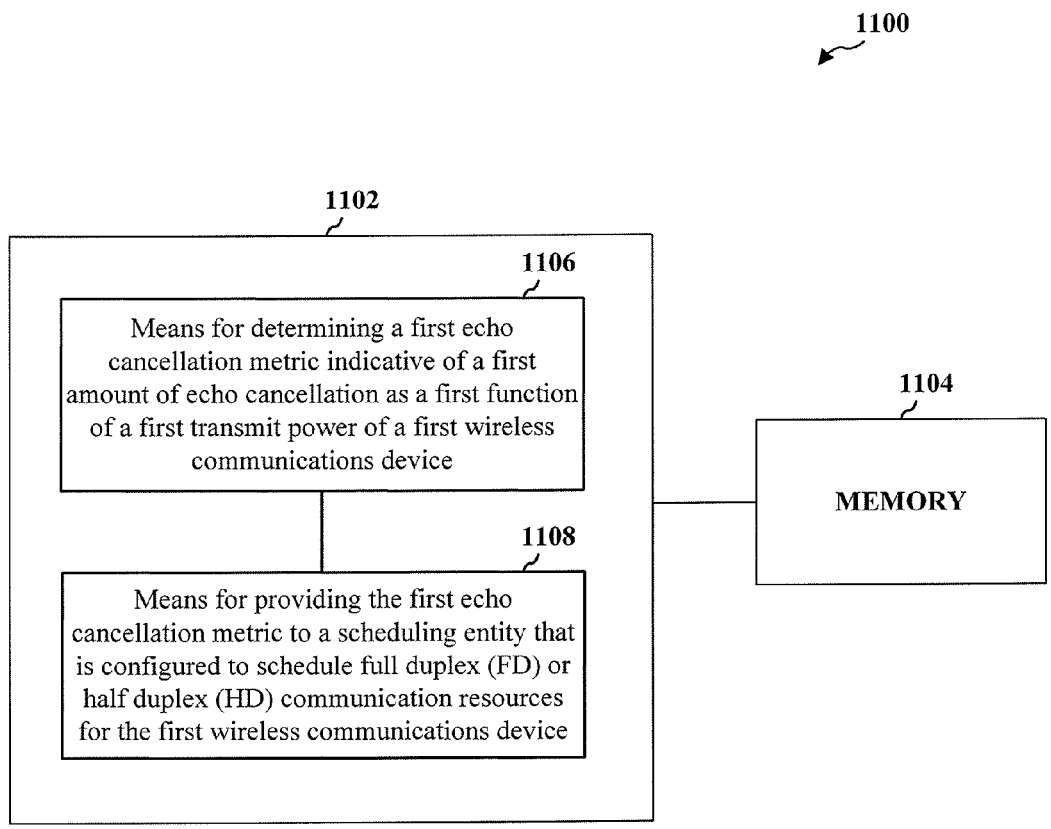
FIGS. 11-13 are diagrams illustrating an example of an apparatus for wireless communications, including aspects of the network architecture of FIG. 1.
Figure 12:
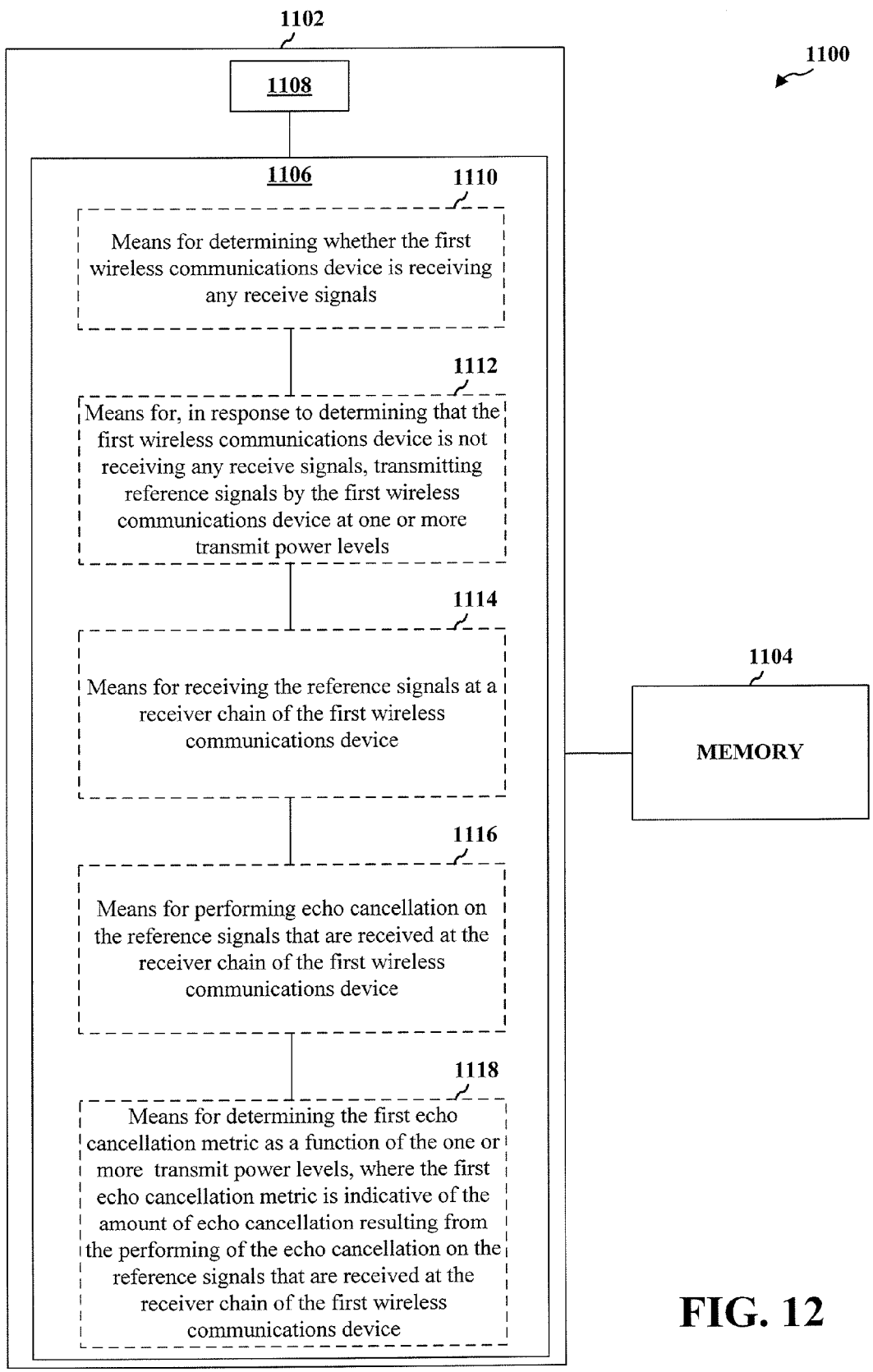
Figure 13:
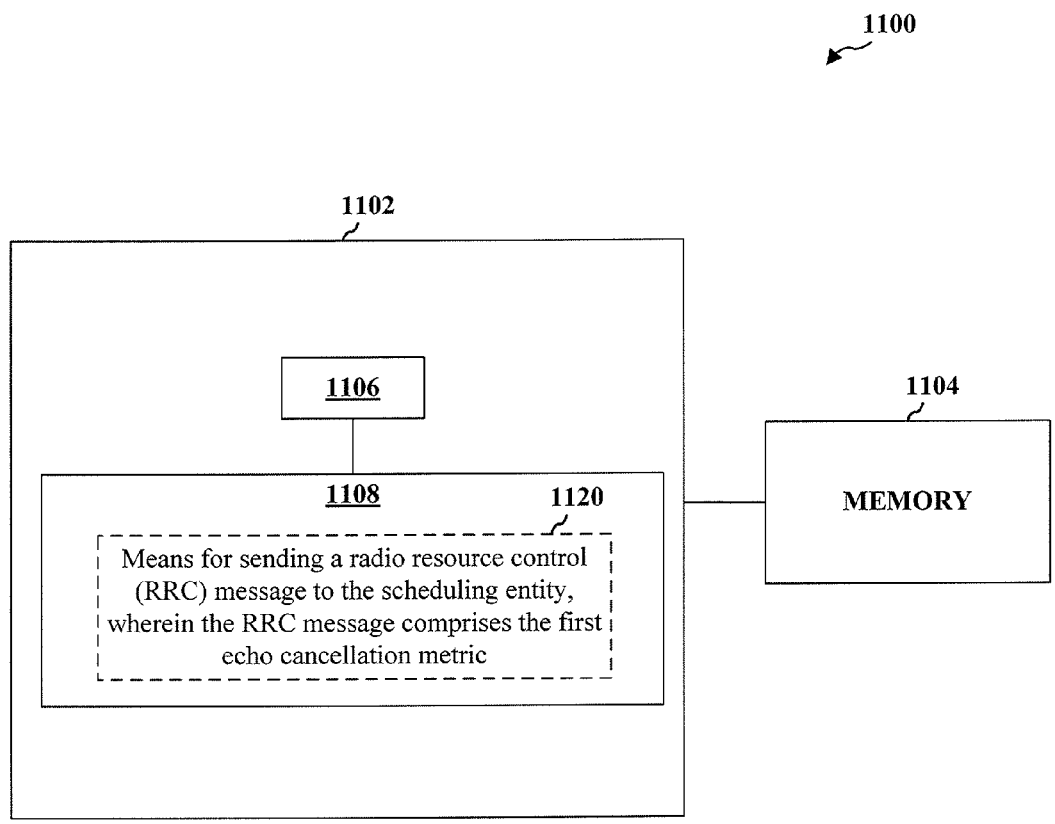

Referring to FIGS. 11-13, an apparatus 1100 for wireless communications is illustrated that can reside at least partially within a user equipment, a network entity, a base station, etc. It is to be appreciated that apparatus 1100 is represented as including functional blocks, which can represent functions implemented by a processor, software, or combination thereof (e.g., firmware). As such, apparatus 1100 includes a logical grouping 1102 of electrical components that can act in conjunction. For instance, logical grouping 1102 can include means for determining a first echo cancellation metric indicative of a first amount of echo cancellation as a first function of a first transmit power of a first wireless communications device (block 1106) and means for providing the first echo cancellation metric to a scheduling entity that is configured to schedule FD or HD communication resources for the first wireless communications device (block 1108). Optionally, as shown in FIG. 12, block 1106 of apparatus 1100 may further include one or more of means for determining whether the first wireless communications device is receiving any receive signals (block 1110), means for transmitting reference signals by the first wireless communications device at one or more transmit power levels when the first wireless communications device is not receiving any receive signals (block 1112), means for receiving the reference signals at a receiver chain of the first wireless communications device (block 1114), means for performing echo cancellation on the reference signals that are received at the receiver chain of the first wireless communications device (block 1116), and means for determining the first echo cancellation metric as a function of the one or more transmit power levels, where the first echo cancellation metric is indicative of the amount of echo cancellation resulting from the performing of the echo cancellation on the reference signals that are received at the receiver chain of the first wireless communications device (block 1118). Also, optionally, as shown in FIG. 13, block 1108 of apparatus 1100 may further include means for sending an RRC message to the scheduling entity, where the RRC message comprises the first echo cancellation metric (block 1120).

For example, in an aspect, the means for determining a first echo cancellation metric indicative of a first amount of echo cancellation as a first function of a first transmit power of a first wireless communications device (block 1106) can include FD capability metric determination component 150 of UE 102 or eNB 106 of FIG. 1 or respective components thereof. Further, for example, in an aspect, the means for providing the first echo cancellation metric to a scheduling entity that is configured to schedule FD or HD communication resources for the first wireless communications device (block 1108) can include UE 102 or eNB 106 of FIG. 1 or respective components thereof.

Additionally, apparatus 1100 can include a memory 1104 that retains instructions for executing functions associated with electrical components 1106 and 1108. While shown as being external to memory 1104, it is to be understood that one or more of electrical components 1106 and 1108 can exist within memory 1104. In an aspect, for example, memory 1104 may be the same as or similar to computer-readable medium 1006 of FIG. 10 or memory 976, 960 of FIG. 9.

Several aspects of telecommunication systems have been presented with reference to various apparatus and methods. These apparatus and methods may be described in the this detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

It is understood that the specific order or hierarchy of steps in the processes disclosed is an illustration of one example of such an approach. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

In the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
   transmitting, by a first wireless communications device, a plurality of reference signals at a corresponding plurality of transmit power levels;
   receiving the plurality of reference signals at a receiver chain of the first wireless communications device;
   performing echo cancellation on the plurality of reference signals received at the receiver chain;
   determining, for each reference signal of the plurality of reference signals, a value of a first echo cancellation metric indicative of a first amount of echo cancellation achieved by performing the echo cancellation on the reference signal; and
   providing each first echo cancellation metric, in a full duplex capability matrix that maps each transmit power level of the plurality of transmit power levels to the value of the first echo cancellation metric corresponding to each reference signal, to a scheduling entity for scheduling full duplex (FD) or half duplex (HD) communication resources for the first wireless communications device.

2. The method of claim 1, wherein the first wireless communication device is a user equipment (UE) or an eNodeB.

3. The method of claim 1, wherein the first echo cancellation metric is at least one metric selected from the group consisting of:
- a residual receive power remaining after performing echo cancellation on a reference signal of the plurality of reference signals;
- a difference between the residual receive power and a respective transmit power level of the plurality of transmit power levels at which the reference signal is transmitted; and
- a rise over thermal ratio at the first wireless communications device upon receiving the plurality of reference signals.

4. The method of claim 1, wherein the providing of the first echo cancellation metric to the scheduling entity comprises:
- sending a radio resource control (RRC) message to the scheduling entity, wherein the RRC message comprises the full duplex capability matrix.

5. The method of claim 1, wherein the scheduling is for a communication between the first wireless communications device and a second wireless communications device based on the first echo cancellation metric and a pathloss value between the first wireless communications device and the second wireless communications device.

6. The method of claim 1, wherein the scheduling is for a communication between the first wireless communications device and a second wireless communications device, and wherein the scheduling is based on at least one metric selected from the group consisting of the first echo cancellation metric, a second echo cancellation metric indicative of a second amount of echo cancellation achieved by performing echo cancellation on a second plurality of reference signals transmitted by the second wireless communications device at a corresponding second plurality of transmit power levels, and a pathloss value between the first wireless communications device and the second wireless communications device.

7. The method of claim 6, wherein the scheduling comprises:
- determining a range of transmit powers below which an FD mode of communication yields a higher throughput compared to an HD mode of communication.

8. The method of claim 6, wherein the scheduling comprises:
- determining a first aggregate throughput corresponding to an FD mode of communication between the first wireless communications device and the second wireless communications device;
- determining a second aggregate throughput corresponding to an HD mode of communication between the first wireless communications device and the second wireless communications device; and
- determining whether to operate in the FD mode of communication or in the HD mode of communication based on the first aggregate throughput and the second aggregate throughput.

9. The method of claim 8, wherein the determining of whether to operate in the FD mode of communication or in the HD mode of communication is performed at each scheduling interval and includes determining to operate in the FD mode of operation when the first aggregate throughput is greater than the second aggregate throughput.

10. An apparatus for wireless communications, comprising:
- means for transmitting, by a first wireless communications device, a plurality of reference signals at a corresponding plurality of transmit power levels;
- means for receiving the plurality of reference signals at a receiver chain of the first wireless communications device;
- means for performing echo cancellation on the plurality of reference signals received at the receiver chain;
- means for determining, for each reference signal of the plurality of reference signals, a value of a first echo cancellation metric indicative of a first amount of echo cancellation achieved by performing the echo cancellation on the reference signal; and
- means for providing the each first echo cancellation metric, in a full duplex capability matrix that maps each transmit power level of the plurality of transmit power levels to the value of the first echo cancellation metric corresponding to each reference signal, to a scheduling entity for scheduling full duplex (FD) or half duplex (HD) communication resources for the first wireless communications device.

11. The apparatus of claim 10, wherein the first wireless communications device is a user equipment (UE) or an eNodeB.

12. The apparatus of claim 10, wherein the first echo cancellation metric is at least one metric selected from the group consisting of:
- a residual receive power, remaining after performing echo cancellation on a reference signal of the plurality of reference signals,
- a difference between the residual receive power and a respective transmit power level of the plurality of transmit power levels at which the reference signal is transmitted; and
- a rise over thermal ratio at the first wireless communications device upon receiving the plurality of reference signals.

13. The apparatus of claim 10, wherein the means for providing the first echo cancellation metric to the scheduling entity comprises:
- means for sending a radio resource control (RRC) message to the scheduling entity, wherein the RRC message comprises the full duplex capability matrix.

14. The apparatus of claim 10, wherein the scheduling is for a communication between the first wireless communications device and a second wireless communications device based on the first echo cancellation metric and a pathloss value between the first wireless communications device and the second wireless communications device.

15. The apparatus of claim 10, wherein the scheduling is for a communication between the first wireless communications device and a second wireless communications device, and wherein the scheduling is based on at least one metric selected from the group consisting of the first echo cancellation metric, a second echo cancellation metric indicative of a second amount of echo cancellation achieved by performing echo cancellation on a second plurality of reference signals transmitted by the second wireless communications device at a corresponding second plurality of transmit power levels, and a pathloss value between the first wireless communications device and the second wireless communications device.

16. The apparatus of claim 15, wherein the means for scheduling includes determining a range of transmit powers below which an FD mode of communication yields a higher throughput compared to an HD mode of communication.

17. The apparatus of claim 15, wherein the scheduling includes:

determining a first aggregate throughput corresponding to an FD mode of communication between the first wireless communications device and the second wireless communications device;

determining a second aggregate throughput corresponding to an HD mode of communication between the first wireless communications device and the second wireless communications device; and determining whether to operate in the FD mode of communication or in the HD mode of communication based on the first aggregate throughput and the second aggregate throughput.

18. The apparatus of claim 17, wherein the determining of whether to operate in the FD mode of communication or in the HD mode of communication is performed at each scheduling interval and includes determining to operate in the FD mode of operation when the first aggregate throughput is greater than the second aggregate throughput.

19. An apparatus for wireless communications, comprising:
a processor;
memory coupled to the processor; and
instructions stored in the memory, the instructions being executable by the processor to:
transmit, by a first wireless communications device, a plurality of reference signals at a corresponding plurality of transmit power levels;
receive the plurality of reference signals at a receiver chain of the first wireless communications device;
perform echo cancellation on the plurality of reference signals received at the receiver chain;
determine, for each reference signal of the plurality of reference signals, a value of a first echo cancellation metric indicative of a first amount of echo cancellation achieved by performing the echo cancellation on the reference signal; and
provide each first echo cancellation metric, in a full duplex capability matrix that maps each transmit power level of the plurality of transmit power levels to the value of the first echo cancellation metric corresponding to each reference signal, to a scheduling entity for scheduling full duplex (FD) or half duplex (HD) communication resources for the first wireless communications device.

20. The apparatus of claim 19, wherein the first wireless communications device is a user equipment (UE) or an eNodeB.

21. The apparatus of claim 19, wherein the first echo cancellation metric is at least one metric selected from the group consisting of:
a residual receive power, remaining after performing echo cancellation on a reference signal of the plurality of reference signals,
a difference between the residual receive power and a respective transmit power level of the plurality of transmit power levels at which the reference signal is transmitted; and
a rise over thermal ratio at the first wireless communications device upon receiving the plurality of reference signals.

22. The apparatus of claim 19, wherein the instructions executable by the processor to determine the first echo cancellation metric comprise instructions executable to:
receive a radio resource control (RRC) message that comprises the full duplex capability matrix.

23. The apparatus of claim 19, the instructions being further executable by the processor to schedule the FD or HD communication resources for a communication between the first wireless communications device and a second wireless communications device based on the first echo cancellation metric and a pathloss value between the first wireless communications device and the second wireless communications device.

24. The apparatus of claim 19, the instructions being further executable by the processor to schedule the FD or HD communication resources for a communication between the first wireless communications device and a second wireless communications device based on at least one metric selected from the group consisting of the first echo cancellation metric, a second echo cancellation metric indicative of a second amount of echo cancellation achieved by performing echo cancellation on a second plurality of reference signals transmitted by the second wireless communications device at a corresponding second plurality of transmit power levels, and a pathloss value between the first wireless communications device and the second wireless communications device.

25. The apparatus of claim 24, the instructions being further executable by the processor to schedule the FD or HD communication resources by determining a range of transmit powers below which an FD mode of communication yields a higher throughput compared to an HD mode of communication.

26. The apparatus of claim 24, wherein the instructions executable by the processor to schedule the FD or HD communication resources comprise instructions executable to:
determine a first aggregate throughput corresponding to an FD mode of communication between the first wireless communications device and the second wireless communications device;
determine a second aggregate throughput corresponding to an HD mode of communication between the first wireless communication device and the second wireless communications device; and
determine to operate in the FD mode of communication at a scheduling interval when the first aggregate throughput is greater than the second aggregate throughput.

27. A non-transitory computer-readable medium storing computer-executable code for wireless communication, the code comprising instructions executable to:
transmit, by a first wireless communications device, a plurality of reference signals at a corresponding plurality of transmit power levels;
receive the plurality of reference signals at a receiver chain of the first wireless communications device;
perform echo cancellation on the plurality of reference signals received at the receiver chain;
determine, for each reference signal of the plurality of reference signals, a value of a first echo cancellation metric indicative of a first amount of echo cancellation achieved by performing the echo cancellation on the reference signal; and
provide each first echo cancellation metric, in a full duplex capability matrix that maps each transmit power level of the plurality of transmit power levels to the value of the first echo cancellation metric corresponding to each reference signal, to a scheduling entity for scheduling full duplex (FD) or half duplex (HD) communication resources for the first wireless communications device.

* * * * *